United States Patent
Linville et al.

(10) Patent No.: US 8,830,625 B2
(45) Date of Patent: Sep. 9, 2014

(54) DATA WRITER WITH TAPERED SIDE SHIELD SIDEWALLS

(71) Applicant: Seagate Technology LLC, Cupertino, CA (US)

(72) Inventors: Eric Shane Linville, Shakopee, MN (US); Jianhua Xue, Maple Grove, MN (US); Eric Roger Meloche, Burnsville, MN (US); Huaqing Yin, Eden Prairie, MN (US); Yonghua Chen, Bloomington, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/689,337

(22) Filed: Nov. 29, 2012

(65) Prior Publication Data

US 2014/0146417 A1    May 29, 2014

(51) Int. Cl.
*G11B 5/11*    (2006.01)
*G11B 5/127*    (2006.01)

(52) U.S. Cl.
CPC ..................................... *G11B 5/127* (2013.01)
USPC ..................................................... 360/125.3

(58) Field of Classification Search
USPC ............. 360/119.01, 119.02, 119.04, 123.37, 360/123.58, 125.03, 125.09, 125.13, 125.3, 360/125.71, 319
See application file for complete search history.

(56) References Cited

U.S. PATENT DOCUMENTS

| | | | |
|---|---|---|---|
| 5,929,526 A | 7/1999 | Srinivasan et al. | |
| 6,228,235 B1 | 5/2001 | Tepman et al. | |
| 6,846,745 B1 | 1/2005 | Papasouliotis et al. | |
| 6,995,949 B2 * | 2/2006 | Nakamura et al. | 360/125.13 |
| 7,205,240 B2 | 4/2007 | Karim et al. | |
| 7,206,166 B2 * | 4/2007 | Notsuke et al. | 360/122 |
| 7,268,057 B2 | 9/2007 | Ryan et al. | |
| 7,397,633 B2 | 7/2008 | Xue et al. | |
| 7,715,147 B2 | 5/2010 | Feldbaum et al. | |
| 7,872,835 B2 | 1/2011 | Guan | |
| 8,000,064 B2 | 8/2011 | Kawano et al. | |
| 8,035,930 B2 | 10/2011 | Takano et al. | |
| 8,081,397 B2 * | 12/2011 | Funayama et al. | 360/125.08 |
| 8,094,419 B2 | 1/2012 | Guan | |
| 8,120,874 B2 * | 2/2012 | Hsiao et al. | 360/119.04 |
| 8,264,798 B1 * | 9/2012 | Guan et al. | 360/319 |
| 8,310,782 B2 * | 11/2012 | Song et al. | 360/121 |
| 8,315,015 B2 * | 11/2012 | Taguchi et al. | 360/125.3 |
| 8,339,741 B2 * | 12/2012 | Zhang et al. | 360/125.74 |
| 8,345,383 B2 * | 1/2013 | Yan et al. | 360/125.03 |
| 8,345,385 B2 * | 1/2013 | Gao et al. | 360/125.3 |
| 8,355,222 B2 * | 1/2013 | Mino et al. | 360/125.3 |
| 8,400,731 B1 * | 3/2013 | Li et al. | 360/125.01 |
| 8,470,185 B2 * | 6/2013 | Mino et al. | 216/22 |
| 8,472,139 B2 * | 6/2013 | Urakami et al. | 360/125.3 |
| 8,472,141 B2 * | 6/2013 | Gao et al. | 360/125.3 |
| 8,537,501 B2 * | 9/2013 | Benakli et al. | 360/319 |
| 8,582,238 B1 * | 11/2013 | Liu et al. | 360/125.3 |
| 8,611,046 B2 * | 12/2013 | Wu et al. | 360/125.3 |

(Continued)

*Primary Examiner* — Angel Castro
(74) *Attorney, Agent, or Firm* — Hall Estill Attorneys at Law

(57) ABSTRACT

A data writer may be generally configured at least with a write pole that has a pole sidewall and a continuous first taper angle connecting leading and trailing edges. The write pole can be positioned adjacent to a side shield that is configured with first and second shield sidewalls tapered to a shield tip that is the closest point between the write pole and side shield.

11 Claims, 4 Drawing Sheets

(56) References Cited

U.S. PATENT DOCUMENTS

| | | |
|---|---|---|
| 2007/0035885 A1* | 2/2007 | Im et al. .................... 360/317 |
| 2009/0002896 A1* | 1/2009 | Mallary et al. ............. 360/319 |
| 2009/0316304 A1 | 12/2009 | Funayama et al. |
| 2010/0149697 A1 | 6/2010 | Nunokawa et al. |
| 2010/0157476 A1 | 6/2010 | Kudo et al. |
| 2010/0277832 A1 | 11/2010 | Bai et al. |
| 2011/0058277 A1* | 3/2011 | de la Fuente et al. ......... 360/122 |
| 2011/0075294 A1* | 3/2011 | Fuchizaki et al. ....... 360/123.12 |
| 2011/0090595 A1 | 4/2011 | Hirata et al. |
| 2011/0102942 A1 | 5/2011 | Bai et al. |
| 2012/0050915 A1 | 3/2012 | Hong et al. |
| 2012/0154951 A1 | 6/2012 | Hsiao et al. |
| 2012/0281314 A1* | 11/2012 | Lopusnik et al. ........ 360/125.03 |

* cited by examiner under the page is US 8,830,625 B2

DATA WRITER WITH TAPERED SIDE SHIELD SIDEWALLS

SUMMARY

Various embodiments are generally directed to a data writer capable of being used in high data bit density data storage environments.

In accordance with various embodiments, a write pole may have a pole sidewall and a continuous first taper angle connecting leading and trailing edges. The write pole may be positioned adjacent to a side shield that is configured with first and second shield sidewalls tapered to a shield tip that is the closest point between the write pole and side shield.

DETAILED DESCRIPTION

As data storage devices advance towards greater data storage capacity and faster data access rates, magnetic shielding of errant magnetic flux has become an acute source of manufacturing and operational performance difficulties as the physical size and tolerances of various device components is reduced. While the minimization of data tracks on which data bits populate can pose a particular operational difficulty in the form of adjacent track interference (ATI), positioning lateral magnetic shields adjacent a magnetic access feature, such as a write pole and magnetoresistive lamination, may mitigate ATI by reducing the magnetic extent of the access feature. However, the addition of lateral magnetic shields can suffer from magnetic field and magnetic gradient loss as the magnetic shields saturate with magnetization intended for the magnetic access feature. Hence, there is a continued industry demand for magnetic shield configurations capable of being implemented in reduced form factor data storage devices without decreasing magnetic field and gradient.

Accordingly, various embodiments can generally be directed to configuring a magnetic element with a write pole having a pole sidewall and a continuous first taper angle connecting leading and trailing edges, where the write pole is positioned adjacent a side shield that is configured with first and second shield sidewalls tapered to a shield tip that is the closest point between the write pole and side shield. The position of the shield tip and the angular orientation of the shield sidewalls from the shield tip in relation to the write pole can be selectively tuned to provide a predetermined magnetic extent. Such tuned magnetic shield configurations can additionally mitigate magnetic flux saturating the shields instead of contributing to data bit access.

Figure 1:
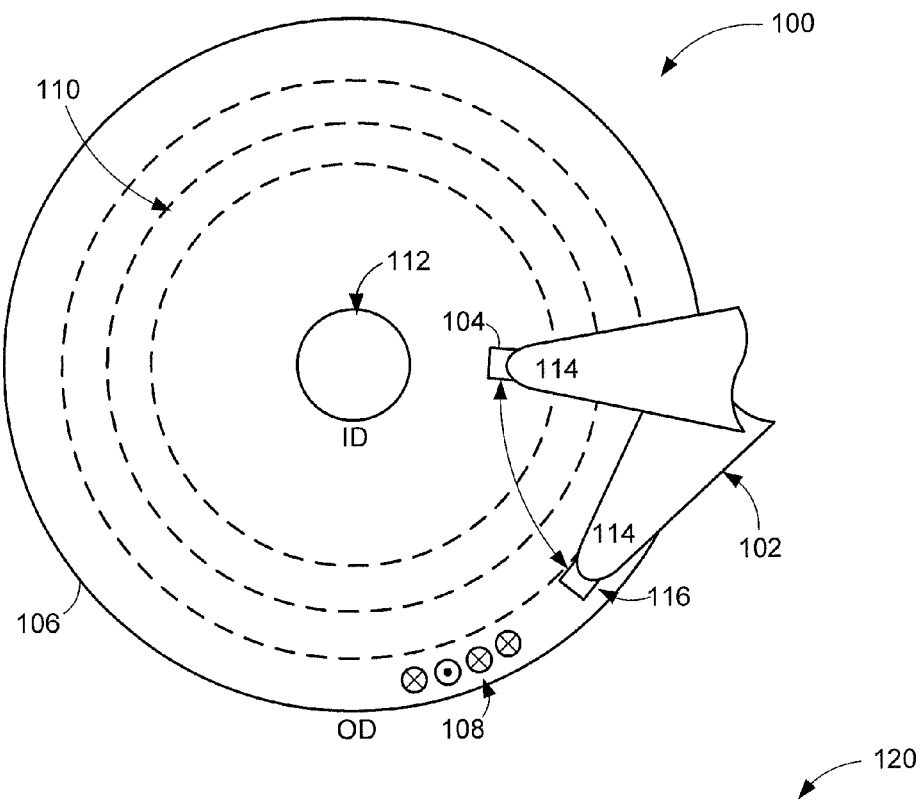
FIG. 1 is a top view block representation of an example data storage device constructed and operated in accordance with various embodiments.

While at least one tuned magnetic shield may be practiced in an unlimited variety of environments, FIG. 1 generally illustrates a top view block representation of an example data storage device 100 that can utilize a tuned magnetic element in accordance with various embodiments. The data storage device 100 is shown in a non-limiting configuration where an actuating assembly 102 is capable of positioning a transducing head 104 over a variety of locations on a magnetic storage media 106 where stored data bits 108 are located on predetermined data tracks 110. The storage media 106 can be attached to one or more spindle motors 112 that rotate during use to produce an air bearing surface (ABS) on which a slider portion 114 of the actuating assembly 102 flies to position a head gimbal assembly (HGA) 116, which includes the transducing head 104, over a predetermined portion of the media 106.

The transducing head 104 can be configured with one or more transducing elements, such as a magnetic writer, magnetically responsive reader, and magnetic shields, which operate to program and read data from the selected data tracks 110 of the storage media 106, respectively. In this way, controlled motion of the actuating assembly 102 correspond with alignment of the transducers with the data tracks 110 defined on the storage media surfaces to write, read, and rewrite data. As data bits 108 become more densely positioned in data tracks 110 with smaller radial widths, the head 104 may inadvertently receive magnetic flux from data bits on adjacent data tracks 110, which can induce magnetic noise and interference that degrades performance of the data storage device 100.

Figure 2:
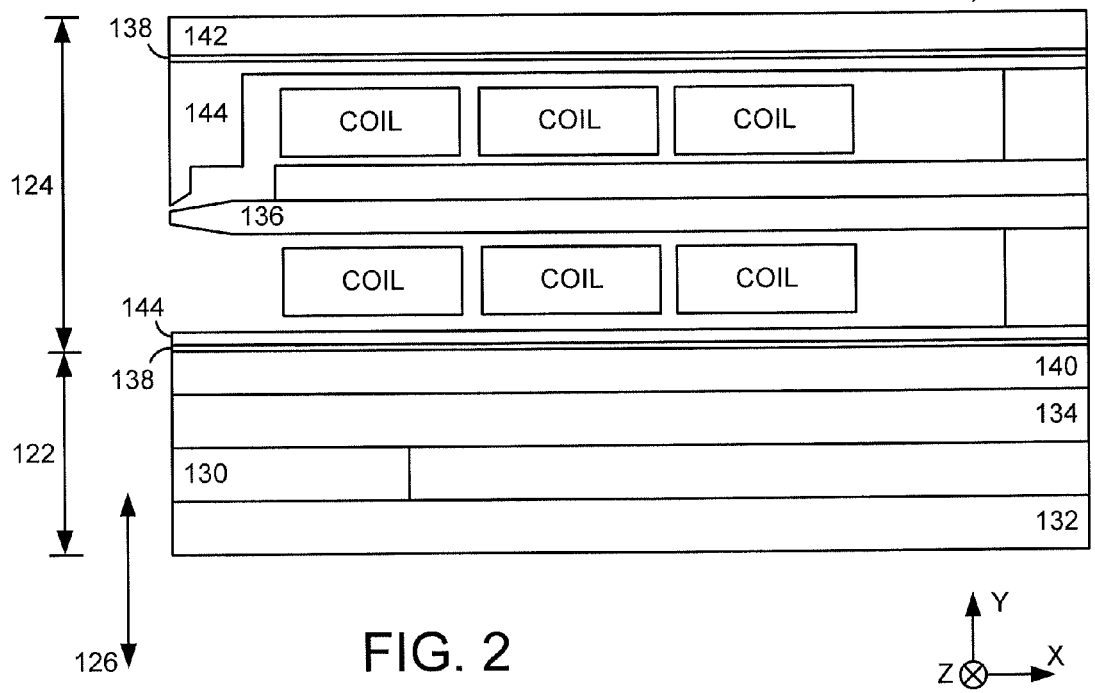
FIG. 2 illustrates a cross-sectional block representation of an example magnetic element capable of being used in the data storage device of FIG. 1.

FIG. 2 displays a cross-sectional block representation of an example magnetic element 120 constructed with magnetic shielding to mitigate the effects of reduced form factor data tracks and more densely packed data bits. As shown, the magnetic element 120 can comprise have one or more data access elements, such as the magnetic reader 122 and writer 124, which can operate individually or concurrently to write data to or retrieve data from an adjacent storage media, such as media 106 of FIG. 1. Each magnetic element 122 and 124 is constructed of a variety of shields and a transducing element that act to read data from and write data to a corresponding data medium along a data track 126.

The magnetic reading element 122 has a magnetoresistive layer 130 disposed between leading and trailing shields 132 and 134. Meanwhile, the writing element 124 has a write pole 136 and at least one return pole 138 that creates a writing circuit to impart a predetermined magnetic orientation to the adjacent storage media. In the non-limiting configuration of the write element 124 shown in FIG. 2, two return poles 138 are each contactingly adjacent a non-magnetic gap layer 140 and trailing shield 142, respectively, that prevent flux from the poles 136 and 138 from extending beyond the bounds of the writing element 124. Each return pole 138 further contacts insulating material 144 that maintains magnetic separation of the writing poles 136 and 138.

The shields of the magnetic element 120 can be characterized by their position with respect to the timing of encountering external bits, such as bits 108 of FIG. 1. In other words, the shields that encounter the external bits before the transducing elements 122 and 124 are "leading" shields while shields that see the bits after the transducing elements are "trailing" shields. Such characterization extends to the difference between "uptrack" or "downtrack" of the transducing elements in that, depending on the direction of travel for the magnetic element 120 and external bits, the shields can be either leading or trailing and either uptrack or downtrack.

While the magnetic element 120 has a plurality of shielding layers positioned along the Y axis that dispel magnetic flux from reaching uptrack and downtrack magnetic bits, increased data bit densities have led to the tighter data tracks 126 that correspond with additional shielding along the Z axis. The addition of side shields in the Z axis in relation to the write pole 136 can cater the magnetic extent of the write pole 136 to conform to a reduced data track 126 width, but such addition can decrease magnetic field amplitude and gradient as magnetization saturates the side shields instead of flowing through the write pole. The reduction in magnetic field can operationally reduce the magnetic sensitivity and data programming efficiency of the write pole 136, which can result in degraded linear data bit density capacity and increased the chances of side track erasure as the write pole inadvertently programs data bits of adjacent data tracks 126.

Figure 3:
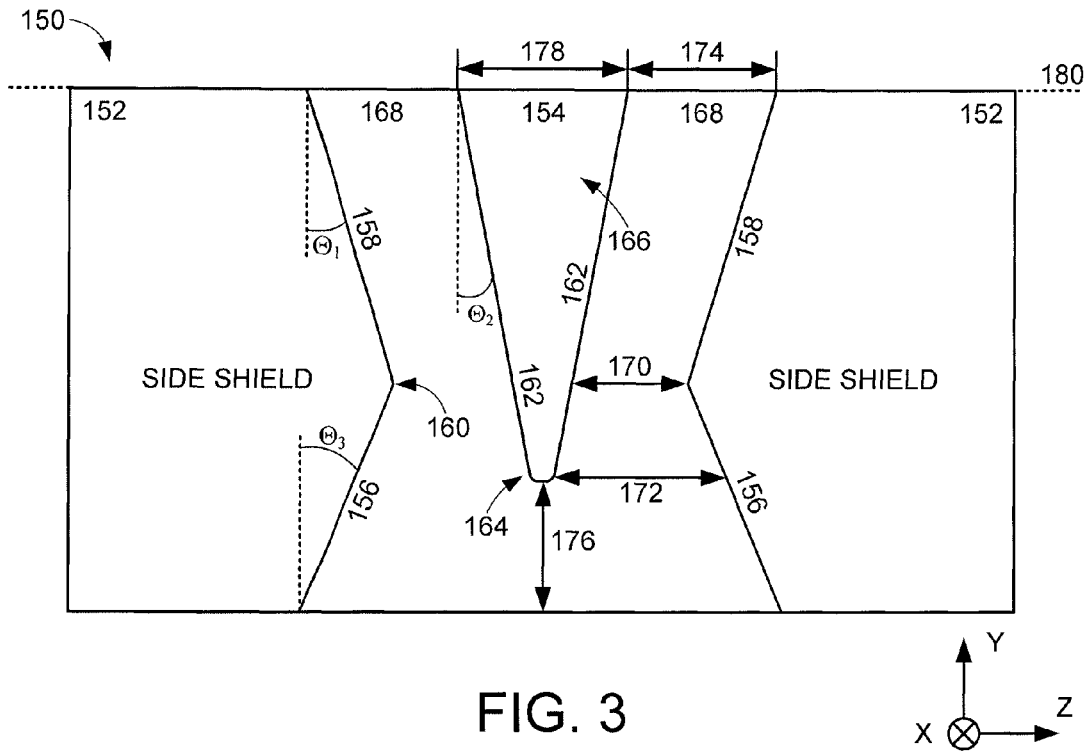
FIG. 3 shows an ABS view block representation of a portion of an example magnetic element constructed in accordance with some embodiments.

FIG. 3 provides an ABS view block representation of a portion of an example magnetic element 150 employing tuned side shields 152 on opposite sides of a write pole 154 in accordance with various embodiments. Each side shield 152 is configured with first 156 and second 158 shield sidewalls that taper to a shield tip 160 while the write pole 154 has pole sidewalls 162 that taper to a pole tip 164 positioned uptrack from a pole body 166. It is to be understood that FIG. 3 is generally illustrated as aligned with a predetermined track where the bottom portion of the magnetic element 150 is uptrack and will encounter a data bit before a downtrack portion at the top plane of the element 150.

Configuring the side shields 152 with a uniform write gap 168 from the pole body 166 to the pole tip 164 by configuring the shield sidewall 158 angle ($\Theta_1$) to match the pole sidewall 162 angle ($\Theta_2$) can provide controlled magnetic extent for the write pole 154, but may provide a conduit for magnetic flux to saturate the side shields 152 instead of being transmitted through the write pole 154. With such magnetic concerns in mind, one or more side shield 152 can be constructed, as shown, so that the shield tip 160 is the closest point between the write pole 154 and the side shield 152. The ability to tune the vertical position of the shield tip 160 along the Y axis and the taper angles ($\Theta_1$ & $\Theta_3$) of the respective shield sidewalls 156 and 158 can control the magnetic extent of the write pole 154 without providing easy magnetic conduits between the write pole 154 and the side shields 152.

As a non-limiting example, each side shield 152 may be configured so that the shield tip 160 is positioned between the pole tip 164, which can be characterized as the leading edge, and the pole body 166, which can be characterized as the trailing edge, and the shield sidewalls 156 and 158 respectively extend in different directions and angles ($\Theta_1$ & $\Theta_3$) from the shield tip 160 so that the distance 170 from the pole sidewall 162 to the shield tip 160 is smaller than either distance 172 and 174 from the pole sidewall 162 to the first 156 or second 158 shield sidewall. Various embodiments tune the distance 174 to be twice the distance 170 and greater than distance 172 to configure the magnetic extent of the write pole 154 to reduce both side track erasure and adjacent track interference.

The presence of fringe magnetic fields proximal the pole tip 164 can contribute to inadvertent programming of adjacent data tracks in a side track erasure condition.

Such condition may be mitigated at least by adjusting the length of the shield sidewalls 156 to extend uptrack from the pole tip 164 a predetermined distance 176, which may be greater than a predetermined width 178 of the pole body 166 at plane 180. With the wide variety of tunable magnetic element characteristics like the taper angles ($\Theta_1$, $\Theta_2$, & $\Theta_3$) of the shield 156, 158 and pole sidewalls 162 as well as the position of the shield tip 160, the magnetic extent of the write pole 154 can be manipulated into a number of different shapes that can increase data writing performance, especially in reduced form factor, high data bit density storage devices.

Figure 4:
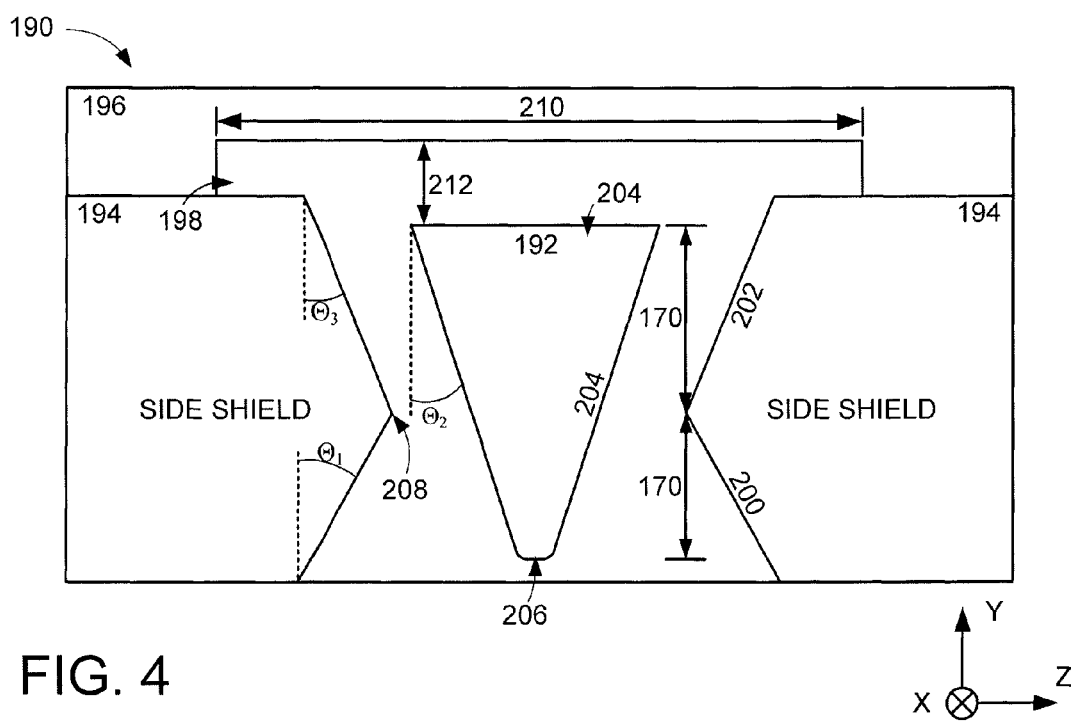
FIG. 4 displays an ABS view block representation of a portion of an example magnetic element constructed in accordance with various embodiments.

FIG. 4 illustrates an ABS view block representation of a portion of an example magnetic element 190 tuned with a variety of structural features in accordance with some embodiments. The magnetic element 190 has a write pole 192 disposed between side shields 194 and a trailing shield 196 each configured with magnetic extent altering features such as letterbox 198, shield sidewalls 200 and 202, and pole sidewalls 204. The write pole 192 is configured with a linear trailing edge 204 and curved leading edge pole tip 206 between which a shield tip 208 is positioned and the shield sidewalls 200 and 202 extend therefrom with lengths that take each sidewall 200 and 202 beyond the bounds of the leading 206 and trailing 204 edges.

As with the shield and pole sidewalls of FIG. 3, the various sidewalls 200, 202, and 204 can be tuned to an unlimited variety of angles ($\Theta_1$, $\Theta_2$, & $\Theta_3$) that allow different shield-to-pole distances at the leading edge 206, trailing edge 204, and shield tip 208. Regardless of the tuned angles of the various sidewalls and size of the gap between the side shield 194 and write pole 192, the inclusion of a letterbox 198 downtrack from the write pole 192 can provide adequate magnetic shielding while minimizing magnetic flux loss from the pole 192, which increases write field gradient, amplitude, and gain. The letterbox 198 is displayed as being formed partially out of the side 194 and trailing 196 shields, but such configuration can be altered, at will, to wholly incorporate the letterbox as part of either the side 194 or trailing 196 shields.

The position and shape of the letterbox 198 may be tuned in various embodiments to provide a balance between magnetic shielding and write field gain and gradient of the write pole 192. That is, the width 210 and distance 212 from the write pole 198 may be tuned, along with the overall shape such as continuously curvilinear and rectangular, to provide predetermined shielding and magnetic performance characteristics for the write pole 192. The addition of a tuned letterbox 198 can reduce magnetic overshoot as stray fields are reduced at least by shape anisotropy provided by the tuned shield sidewalls 200 and 202 having the longest sidewall closest to the write pole 192. The letterbox 198 may be complemented by the tuned position of the shield tip 208 provided by leading 214 and trailing 216 distance of the shield tip 208 from the respective leading 206 and trailing 204 edges of the write pole 192 to reduce side track erasure and increase magnetic transition curvature.

Figure 5:
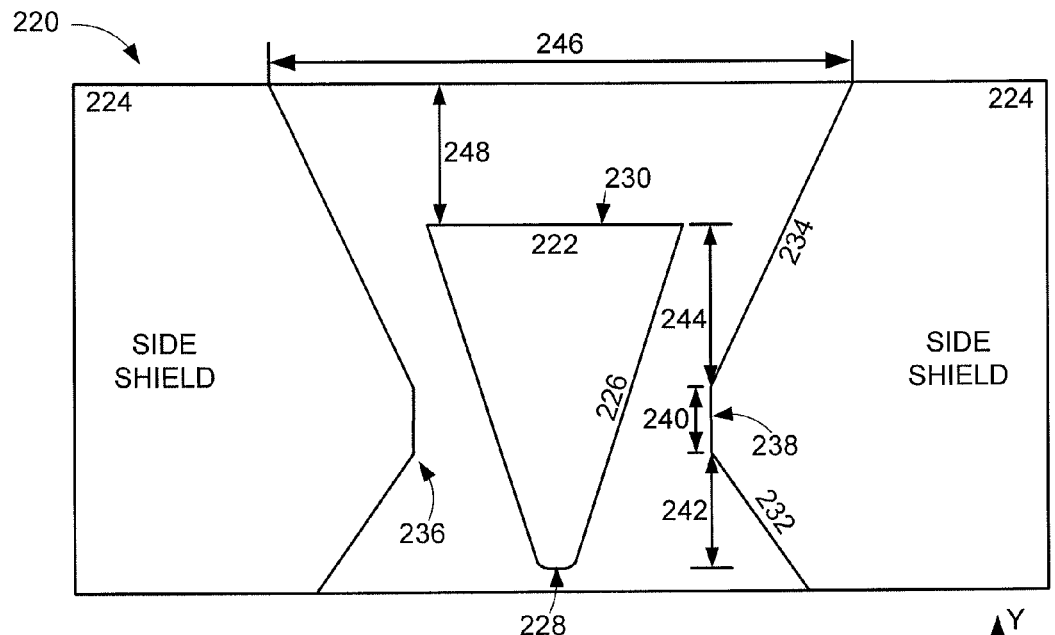
FIG. 5 illustrates an ABS view block representation of a portion of an example magnetic element constructed in accordance with various embodiments.

While the configurations of the side shields 194, write pole 192, and letterbox 198 can position shielding material in predetermined proximity to selected portions of the write pole 192 and allow magnetically insulating material to be disposed between the shields 194 and 196 and the write pole 192, the various magnetic element 190 components may further be tuned for shape, material, size, and position to manipulate the magnetic extent of the write pole 192 while providing optimized magnetic write fields. FIG. 5 generally displays an ABS view block representation of a portion of an example magnetic element 220 tuned in accordance with various embodiments. The magnetic element 220 has a write pole 222 disposed between side shields 224 that are each tuned to provide more than two shield sidewalls.

As shown, the write pole 222 has a substantially trapezoidal shape with opposite facing pole sidewalls 226 connecting leading 228 and trialing 230 edges. Each side shield 224 is configured with first 232 and second 234 shield sidewalls tapering at predetermined angles from a shield tip 236 consisting of a tip sidewall 238. In comparison to the shield tip 208 of FIG. 4, the shield tip 236 is not the meeting point of two surfaces but instead a surface having a predetermined length 240 connecting the other shield sidewalls 232 and 234. The use of a linear surface for the tip sidewall 238, or alternatively a continuously curvilinear surface in some embodiments, provides another tunable structural surface that allows the write gap between the write pole 222 and side shields 224 to vary at predetermined distances 242 and 244 in relation to the pole sidewall 226.

The shape and position of the tip sidewall 238 can allow the first 232 and second 234 shield sidewalls to taper and extend at angles that would bring the shield sidewalls too close to the write pole 222 if the shield sidewalls 232 and 234 met at a point. For example, the length of the tip sidewall 238 may allow the second shield sidewall to extend from the shield tip 236 at a lesser angle to provide a predetermined distance to the trailing edge 230 of the write pole 222 than if the length 240 of the tip sidewall 238 were not present. Such lesser shield sidewall angles may be utilized, in some embodiments, to form a predetermined side shield width 246 a predetermined downtrack distance 248 from the write pole 222, which can create letterbox-type write field gain and gradient optimization without the additional manufacturing of a letterbox into the side 224 and/or trailing shields.

Figure 6:
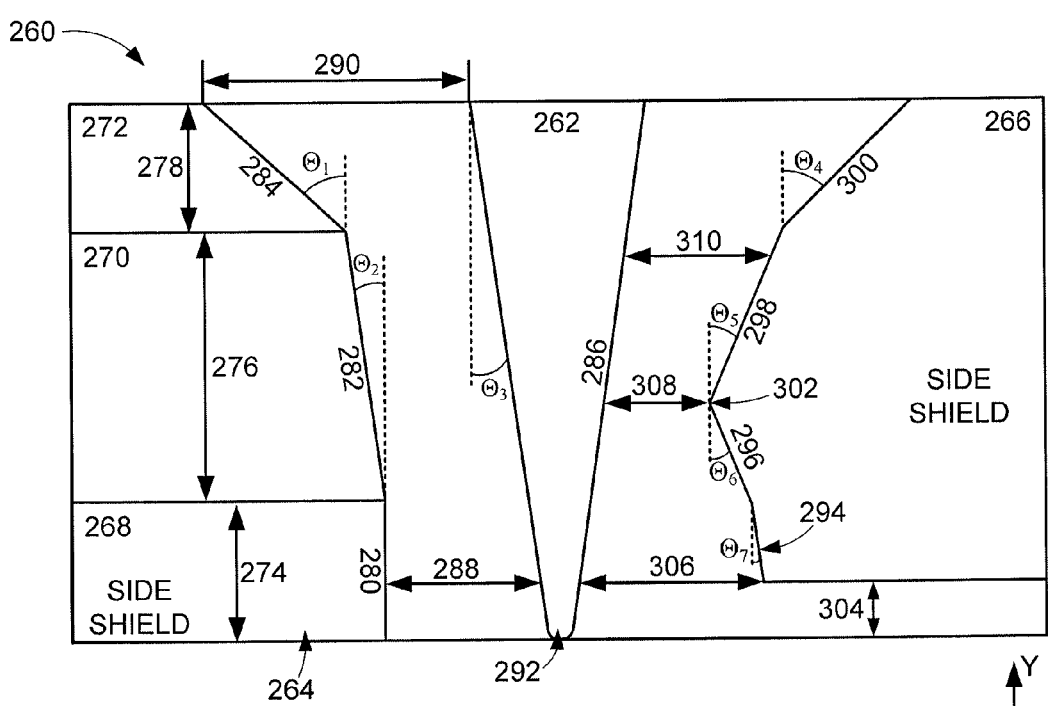
FIG. 6 is an ABS view block representation of a portion of an example magnetic element constructed in accordance with some embodiments.

The wide variety of shielding configurations possible by tuning the various shield and pole sidewalls are not limited to mirroring structures on opposite sides of the write pole 222. FIG. 6 generally illustrates how an example magnetic element 260 can be tuned to control the magnetic extent of a write pole 262 with differing side shield 264 and 266 configurations constructed in accordance with some embodiments. The ABS view of the magnetic element 260 displays a first side shield 264 constructed as a lamination of multiple different materials having different magnetic shielding characteristics and structural orientations.

In the example shown in FIG. 6, the first side shield 264 has first 268, second 270, and third 272 shield layers each having different thicknesses 274, 276, and 278 along the Y axis and different shield sidewalls 280, 282, and 284 oriented with different angles ($\Theta_1$ & $\Theta_2$) with respect to the pole sidewall 286 ($\Theta_3$). Some embodiments configure the shield sidewalls 280, 282, and 284 to provide a leading distance 288 between the side shield 264 and the leading edge of the write pole 262 that is half a trailing distance 290 between the side shield 264 and the trailing edge of the write pole 262. Configuring the leading distance 288 as half the trailing distance 290 can provide write field optimized for minimum adjacent track interference.

The increasing write gap between the first side shield 264 and write pole 262 can be complemented by the use of materials exhibiting different magnet moments. For example, the first layer 268 can be constructed with a first predetermined moment, such as 2.4 Tesla, while the second layer 270 has a different second predetermined moment, such as 1.4 Tesla, and the third layer 272 is configured with a different third predetermined moment, such as 1.0 Tesla. The varying magnetic moments of the different layers 268, 270, and 272 can minimize write field loss as stray magnetic fields are controlled, particularly proximal to the leading pole tip 292. The ability to tune the size, position relative to the write pole 262, and material of the various side shield 264 lamination provides additional tuning aspects that can allow precise articulation of the magnetic extent and magnetic characteristics of the write pole 262.

While the use of multiple different shield layers 268, 270, and 272 and materials can provide precise tuning capabilities, additional manufacturing complexity and processing may counteract the effects of the laminated side shield configuration. The second side shield 266 displays how a single layer and material can be constructed with a plurality of shield sidewalls 294, 296, 298, and 300 constructed with different angular orientations ($\Theta_4$, $\Theta_5$, $\Theta_6$, & $\Theta_7$) to produce a shield tip 302 that is the closest point between the write pole 262 and the second side shield 266.

The position of the shield tip 302 may be positioned proximal to any predetermined portion of the pole sidewall 286, but such predetermined portion may be more towards the trailing portion of the write pole 262 when the side shield extends a plane downtrack from the leading pole tip 292. That is, the position of the shield tip 302 may be chosen in response to the downtrack distance 304 the side shield 266 extends. Such downtrack distance 304 may further alter the leading 306, tip 308, and trailing 310 distances to balance magnetic shielding with write field gain and gradient to provide predetermined adjacent track interference and side track erasure mitigation.

Figure 7:
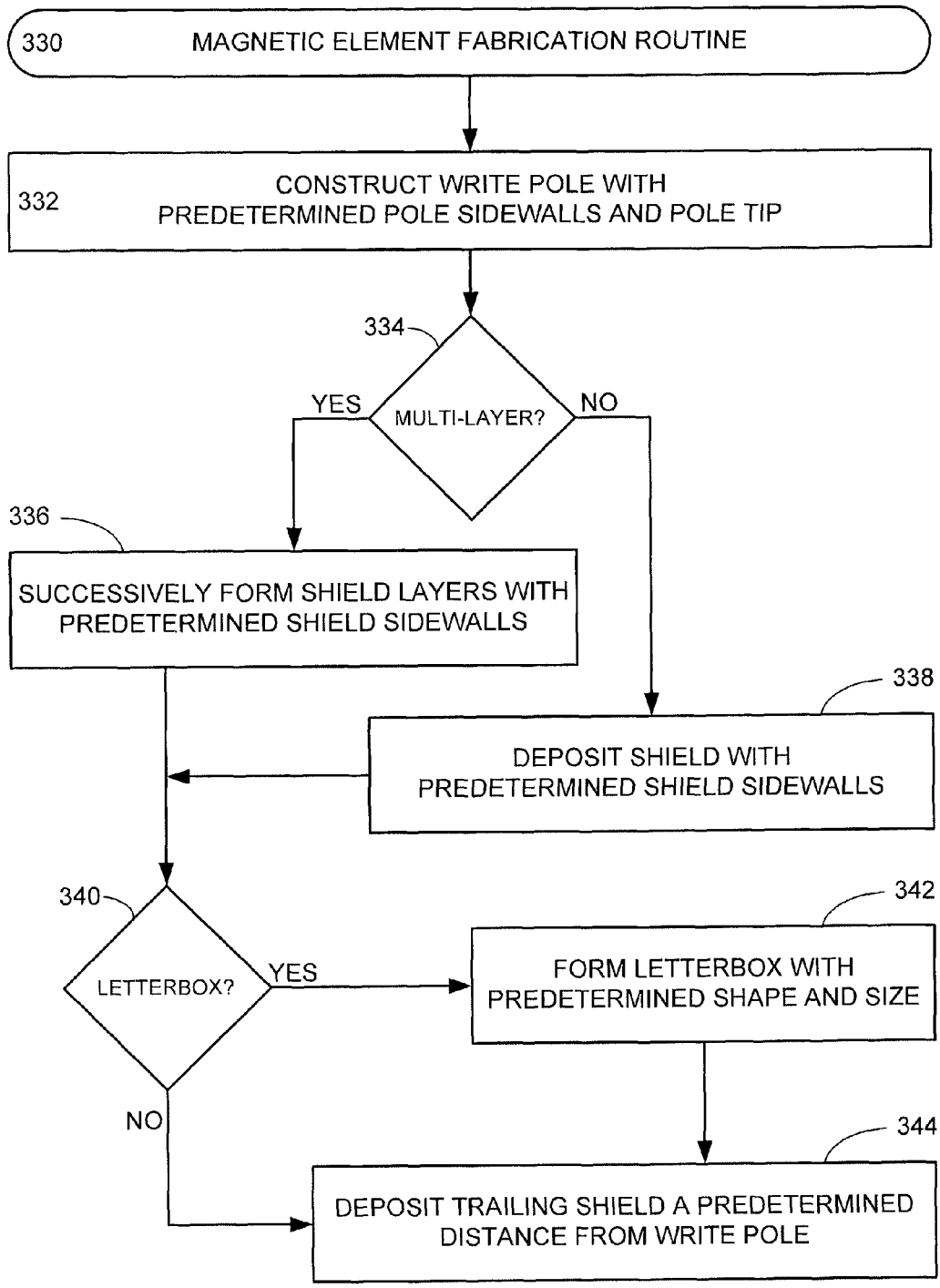
FIG. 7 provides a flowchart for an example magnetic element fabrication routine conducted in accordance with various embodiments.

With the variety of non-limiting side shield configurations possible to optimize write field and data bit programming performance, the construction of a magnetic element can undergo a series of general and specific decisions to tune the magnetic operation. FIG. 7 provides an example magnetic element fabrication routine 330 conducted in accordance with various embodiments to tune the magnetic shielding and magnetic write field performance of a magnetic element. Initially, routine 330 constructs a write pole with a predetermined shape, sidewalls, and pole tip in step 332.

Decision 334 determines whether or not one, or both, side shields are to be constructed as a multi-layer lamination. If a plurality of different side shield layers are to be utilized from decision 334, step 336 successively forms each side shield layer with predetermined materials, thicknesses, and shield sidewall angular orientations. In contrast, step 338 deposits a single side shield layer and forms a shield tip with a predetermined number of shield sidewalls extending therefrom. Various embodiments configure the shield sidewalls to extend beyond the leading and trailing edges of the write pole with other embodiments position the shield tip proximal a predetermined portion of the write pole, such as 10%, 30%, or 50% of the length of the pole sidewall from the leading edge.

It should be noted that the formation of side shields on opposite sides of the write pole can be accomplished through performing either steps 336 and 338 once, or multiple times. The formation of side shields on opposing sides of the write pole advances the routine 330 to decision 340 where the inclusion of letterbox, such as letterbox 198 of FIG. 4, is contemplated. Step 342 forms a letterbox that has a predetermined shape, such as rectangular, trapezoidal, and rectangular shapes, a predetermined size, and a predetermined distance from the write pole. Such letterbox construction may incorporate the processing of one, or both, side shields and a trailing shield that is subsequently deposited in step 344. That is, a letterbox may be wholly incorporated into the side or trailing shields or made up of a combination of surfaces provided by both the side and trailing shields.

In the event a letterbox is not to be incorporated into the magnetic element in decision 340, step 344 deposits the trailing shield a predetermined distance from the write pole without forming an internal letterbox opening. Through the various decisions and steps of routine 330, a magnetic element can be optimized for performance by balancing magnetic shielding with write field performance through tuned configurations of the various side shield sidewalls, distances, and shield tip positions. For example, the tapered shield sidewalls and position of the shield tip can be configured in a variety of positions relative to the write pole to provide more, or less, magnetic shielding combined with decreased, or minimized, risk of inadvertent performance characteristics, such as side track erasure and adjacent track interference.

It should be noted, however, that the various steps and decisions of routine 330 shown in FIG. 7 are not required or limited as the various decisions and steps can be omitted, changed, and added. As an example, decision 334 and steps 336 and 338 can be performed multiple times with similar or different results to construct side shields positioned on opposite sides of the write pole.

The plethora of side shield structural parameters that can be tuned to provide predetermined magnetic shielding and data bit programming performance illustrates the vast possible side shield configurations capable of controlling the magnetic extent of a write pole. Such side shield configurations may be tuned to provide heightened magnetic field performance with optimized write field gain and gradient while other configurations may be tuned to minimize inadvertent performance conditions resulting from errant magnetic fields and magnetic saturation of the side shields. The ability to balance these various performance characteristics by tuning the various structural aspects of the side shields with respect to the write pole conveys the versatility of side shield construction, especially in regard to adapting to increased data bit density, reduced form factor data storage devices.

In addition, while the embodiments have been directed to magnetic programming, it will be appreciated that the claimed invention can readily be utilized in any number of other applications, including data storage device applications. It is to be understood that even though numerous characteristics and configurations of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. For example, the particular elements may vary depending on the particular application without departing from the spirit and scope of the present technology.

What is claimed is:

1. An apparatus comprising a write pole having opposing first and second pole sidewalls each extending at a continuous first taper angle to connect leading and trailing edges on an air bearing surface (ABS), the leading and trailing edges bisected by a longitudinal axis extending through the write pole and about which the first and second pole sidewalls are symmetrically aligned, the write pole adjacent a side shield configured with first and second shield sidewalls tapered to a shield tip on the ABS, the first and second shield sidewalls are non-perpendicular and non-parallel to the longitudinal axis, the shield tip positioned between the leading and trailing edges and being the closest point between the write pole and side shield on the ABS.

2. The apparatus of claim 1, wherein the shield tip is positioned between the leading and trailing edges.

3. The apparatus of claim 1, wherein the first and second shield sidewalls extend from the shield tip at opposing angles with respect to the longitudinal axis.

4. The apparatus of claim 1, wherein the first and second shield sidewalls extend from the shield tip at different second and third taper angles with respect to the longitudinal axis.

5. A magnetic element comprising a write pole having opposing first and second pole sidewalls each extending at a continuous first taper angle to connect leading and trailing edges on an air bearing surface (ABS), the opposing first and second pole sidewalls symmetric about a longitudinal axis of the write pole that bisects the leading and trailing edges, the write pole disposed between and separated from first and second side shields each configured with first and second shield sidewalls tapered to a shield tip on the ABS, the shield tip of each of the first and second side shields positioned between the leading and trailing edges and being the closest point between the write pole and the associated side shield on the ABS, wherein the first shield sidewall of each of the first and second side shields is non-perpendicular and non-parallel to the longitudinal axis.

6. The magnetic element of claim 5, wherein the first and second side shields have a different total number of shield sidewalls.

7. The magnetic element of claim 5, wherein at least one of the side shields comprises multiple layers with different magnetic moments.

8. The magnetic element of claim 7, wherein the multiple layers have different thicknesses.

9. The magnetic element of claim 7, wherein a first layer of the multiple layers has a first magnetic moment is positioned proximal the leading edge, the first magnetic moment being greater than a second magnetic moment of a second layer of the multiple layers.

10. The magnetic element of claim 5, wherein the second shield sidewall of at least one of the first and second side shields extends to a plane downtrack from the leading edge.

11. The magnetic element of claim 5, wherein the second shield sidewall of each of the first and second side shields is also non-perpendicular and non-parallel to the longitudinal axis.

* * * * *